United States Patent [19]

Yoshida

[11] Patent Number: 4,625,112

[45] Date of Patent: Nov. 25, 1986

[54] TIME OF FLIGHT MASS SPECTROMETER

[75] Inventor: Yoshikazu Yoshida, Yawata, Japan

[73] Assignee: Shimadzu Corporation, Kyoto, Japan

[21] Appl. No.: 622,845

[22] Filed: Jun. 21, 1984

[30] Foreign Application Priority Data

Nov. 30, 1983 [JP] Japan ............................... 58-227393

[51] Int. Cl.[4] ............................................ B01D 59/44

[52] U.S. Cl. .................................... 250/287; 250/286

[58] Field of Search ............... 250/286, 287, 281, 288, 250/423 P

[56] References Cited

U.S. PATENT DOCUMENTS 3,258,591 6/1966 Blauth et al. ........................ 250/286

3,626,181 12/1971 Weinlund ............................ 250/287

4,295,046 10/1981 Grütter et al. .................. 250/423 P

OTHER PUBLICATIONS

"Inhomogeneous Oscillatory Electric Field Time-of-Flight Mass Spectrometer", Carrico, *J. of Physics E: Sci. Ins.*, 1977, pp. 31-36, 250-287.

*Primary Examiner*—Bruce C. Anderson

*Attorney, Agent, or Firm*—Stiefel, Gross, Kurland & Pavane

[57] ABSTRACT

A time of flight mass spectrometer comprising the analyzer tube having a plurality of ring-like electrodes on the same axis in which a voltage as a force in an inverse proportion to the distance is given to ions applied.

9 Claims, 6 Drawing Figures

TIME OF FLIGHT MASS SPECTROMETER

BACKGROUND OF THE INVENTION (1) Field of the invention

This invention concerns a time of flight mass spectrometer and, more specifically, it relates to a time of flight mass spectrometer with an improved resolution.

(2) Description of the Prior Art

When identical energy is applied to ions, flying velocities of the ions are different depending on their mass and, accordingly, a time of flight required for travalling a certain distance is different depending on the mass of the ion. Thus, it is a basic theory of a time of flight mass spectrometer to analyze the mass of an ion depending on the time of flight of the ion.

By the way, since it is actually impossible to apply just the same level of energy to the respective ions, even those ions of a same mass inevitably have a certain spread of energy and, as the result, their time of flight has a certain spread. Then, as this spread becomes greater, the resolution power for the mass analysis is reduced.

Conventional time of flight mass spectrometers are disclosed for instance in U.S. Pat. No. 3,727,047 and Japanese Patent Laid-Open No. 44953/1982. However, these analyzers can not sufficiently overcome the reduction in the resolution power caused by the spread of the energy as described above.

SUMMARY OF THE INVENTION

In accordance with this invention, there is provided a time of flight mass spectrometer comprising:

an ion emitting means having a sample stage applied with a voltage and a radiating means for radiating pulse laser beams or electron beams to a sample for generating ions therefrom, an analyzer tube having a plurality of ring-like electrodes secured at an equal interval from each other on the same axis of direction in which a voltage Vn applied to an $n_{th}$ ring-like electrode from the ion emitting means has such a relationship with respect to the distance Xn from the ion emitting means to the nth ring-like electrode as: $Vn=aXn^2+bXn$ and the voltage Vn is applied to each of the ring-like electrodes (where the constants a, b are represented as: $b=V_L/L-aL$, or b=0 and $a=V_L/L^2$, L being the length of the analyzer tube, and $V_L$ being the voltage applied to the ring-like electrode at the rearmost end of the analyzer tube), and an ion detecing means disposed opposing to the analyzer tube for detecting ions turned back from the inside and getting out of the analyzer tube.

According to the time of flight mass spectrometer of this invention, since an electric field whose strength is in proportion to the distance between an ion generation position and an analyzer tube is formed along a direction opposite to the ion travelling direction in the analyzer tube in the case where the ion generation position situates near the analyzer tube, ions conduct single harmonic oscillations at a certain period like that of a pendulum, whereby the time of flight of the ions are no more depended on the initial energy of the ions. This can prevent the reduction in the resolution due to the spread of the initial energy of the ions and provide a higher resolution power.

Furthermore, even in the case where the ion generation position situates remote from the analyzer tube, the reduction in the resolution can also be prevented to obtain a higher resolution by forming an electric field within the analyzer tube such that the ions conduct single harmonic oscillations at a certain period.

Furthermore, in a different point of view, the mass analysis for ions having a greater spread of initial energies as the ions generated by pulse laser beams can be performed at a high resolution as well as time resolution mass spectrum in high velocity chemical reactions can be obtained at a high resolution.

DESCRIPTION OF THE PREFERRERD EMBODIMENT

In this invention, known ion emitting means can be used and a sample to be analyzed may usually be a solid matter or gas depending on the case. The energy source employed to radiate the sample for generating ions therefrom may include pulse laser beams or pulse electron beams.

The analyzer tube in this invention has a characteristic feature in its structure comprising a plurality of ring-like electrodes, as well as in the voltage applied thereto or electric field generated therefrom.

The mass analyzer according to this invention is distinguished from conventional mass analyzers in that it is adapted based on the principle of pendulum that a force in an inverse proportion to the distance is given to ions, so that the ions may be reflected at a same instance of time even when they enter into the analyzer tube with different initial energies.

Furthermore, while an ion lens has often been used for the ion emitting means and it results in a distance between the ion generation position and the analyzer tube, such a free drift region is adapted such that the principle of pendulum can be ensured by the application of a specific voltage (electric field) to the analyzer tube in this invention.

The ion detecting means usable herein is known by itself in the prior art.

Figure 1:
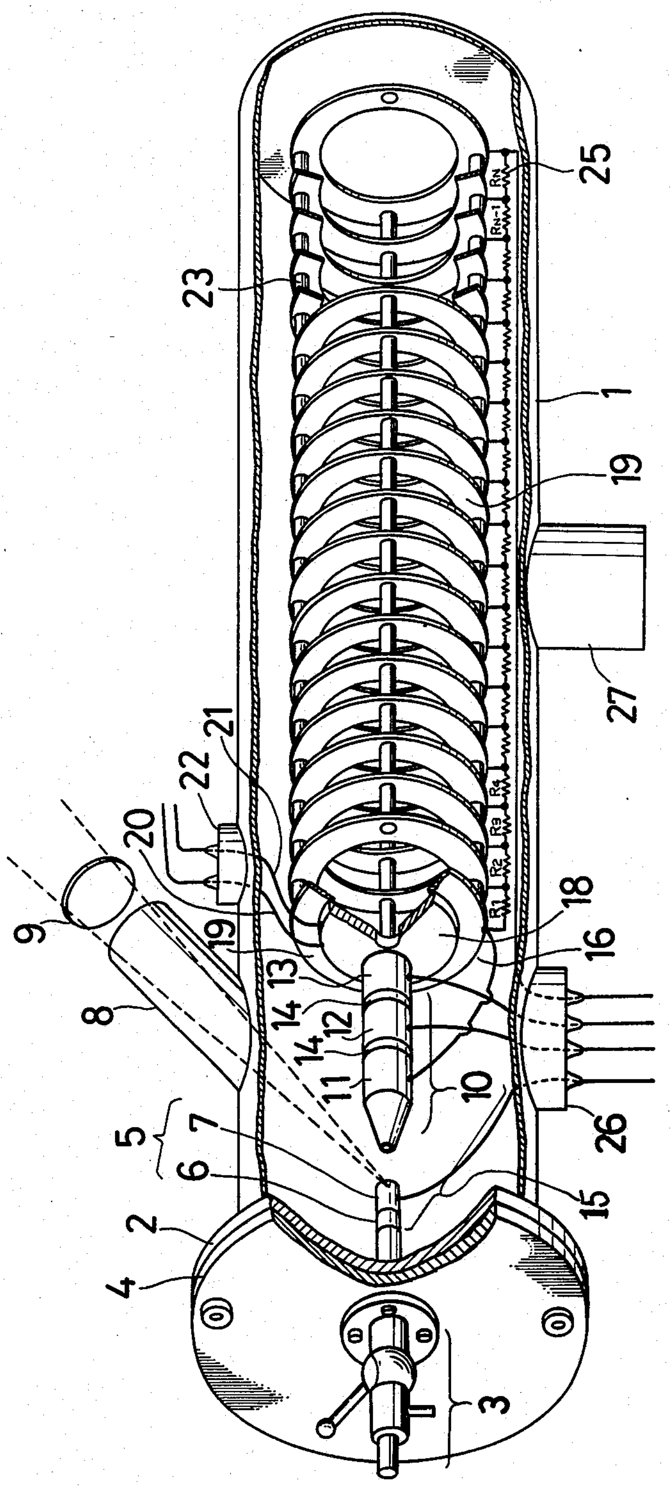
FIG. 1 is a partially cut away perspective view of a time of flight mass spectrometer according to this invention.
Figure 2:
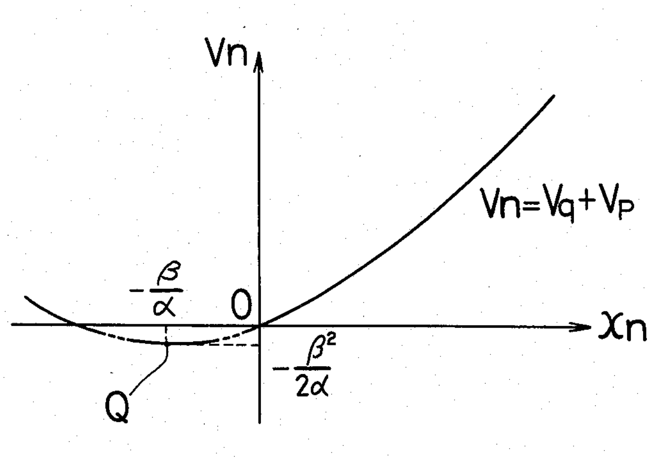
FIG. 2 is a characteristic chart showing the electric potential in an analyzer tube in the apparatus shown in FIG. 1.
Figure 3:
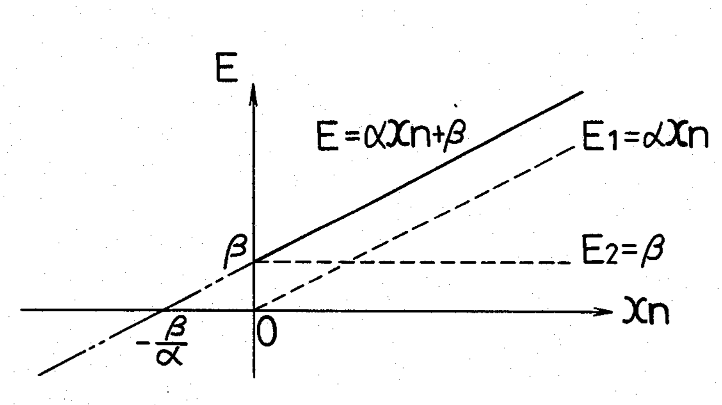
FIG. 3 is a characteristic chart showing the strength of the electric field in the analyzer tube of the apparatus shown in FIG. 1.

This invention will now be described more specifically referring to FIG. 1, in which a cylindrical outer casing 1 made of stainless steel has a flange 2 welded at one end and is closed tightly at the other end thereof. The outer casing 1 has a sufficient strength so as not to be collapsed when the inside space thereof is evacuated. To the inside of the outer casing 1, are disposed an ion emitting means, an analyzer tube and an ion detecting means on the axis a of the outer casing 1 as detailed below.

A disc 4 disposed with a sample introduction part 3 is secured about at the center of the flange 2 by means of screws or the likes so as to tightly close the outer casing 1. An ion generation part 5 is disposed to the disc 4 while being extended from the sample introduction part 3 to the inside of the outer casing 1. The ion generation part 5 has a sample stage 7 provided at the top end thereof by way of an insulating standoff 6, and a sample voltage is applied to the stage 7. A window port 8 for introducing pulse laser beams introduces laser beams emitted from a laser source of radiation (not shown) while focusing the beams through a lens 9 onto the sample step 7. An ion lens 10 is situated ahead of the ion generation part 5, in which cylindrical electrodes 11, 12, 13 and insulating standoffs 14, 14 are disposed alternately. The electrode 12 is applied with a lens voltage, while the electrode 11 and the electrode 13 are at the ground potential. The ion lens 10, the ion generation part 5 and the a laser source of radiation constitute an ion emitting means 15.

An ion detecting means 16 and an analyzer tube 17 are disposed ahead of the ion emitting means 15. The ion detecting means 16 is formed with an aperture about at the center thereof for passing ions released from the ion emitting means 15 therethrough and a micro channel plate 18 for detecting the ion reflected from the analyzer tube 17 is attached to ring-like electrodes 19. The micro channel plate 18 is applied with a power source voltage. The outer casing 1 situated above the ion detecting means 16 has an exit 22 for leading out a conductor 20 that introduces a voltage to be applied to the micro channel plate 18 and a conductor 21 that takes out ion detection signals from the micro channel plate 18.

The analyzer tube 17 is composed of a plurality of ring-like electrodes 19 assembled at an equal interval from each other in a cylindrical configuration while putting each of insulating standoffs 23 between them. The ring-like electrode 19 has a size, for example, 1 mm in thickness and 40 mm in inner diameter. The analyzer tube 17 comprises, for instance, 100 sheets of ring-like electrodes 19 secured each at a 10 mm interval. A resister 24 is connected between each of the ring-like electrodes 19 for applying a voltage to the ring-like electrode 19. Further, a reflector voltage is applied to the top and ring-like electrode 19, while the ring-like electrode 19 disposed with the micro channel plate 19 is at a ground potential. An exit 26 that takes out inner a wirings for the sample voltage, lens voltage, reflector voltage and ground potential is disposed to the outer casing 1 situated below the ion lens 10. The conductor leading portions for the exit 22 and the exit 26 are respectively sealed hermetically.

An opening 27 is formed to the wall of the outer casing 1 below the analyzer tube 17 in communication with the inside of the casing 1, which is to be in connection with a vacuum pump.

The operation of the time of flight mass spectrometer according to this invention will now be explained.

To each of the ring-like electrodes 19, is applied a voltage Vn as the sum of a voltage Vq in proportion to the square of each distance Xn and a voltage Vp in proportion to the distance Xn from the end of the ion emitting means 15.

Assuming here the voltage Vq and Vp as:

$$Vq = \tfrac{1}{2}\alpha Xn^2 \ldots \quad (1\text{-}1)$$

$$Vp = \beta Xn \ldots \quad (1\text{-}2)$$

Vn is represented as:

$$Vn = Vq + Vp = \tfrac{1}{2}\alpha\left(Xn + \frac{\beta}{\alpha}\right)^2 - \frac{\beta^2}{2\alpha} \quad (1\text{-}3)$$

Accordingly, the voltage Vn for each of the electrodes 19 increases in proportion to the square of the distance viewed from a reference point Q on the side of the ion emitting means 15 from the analyzer tube 17.

Figure 4:
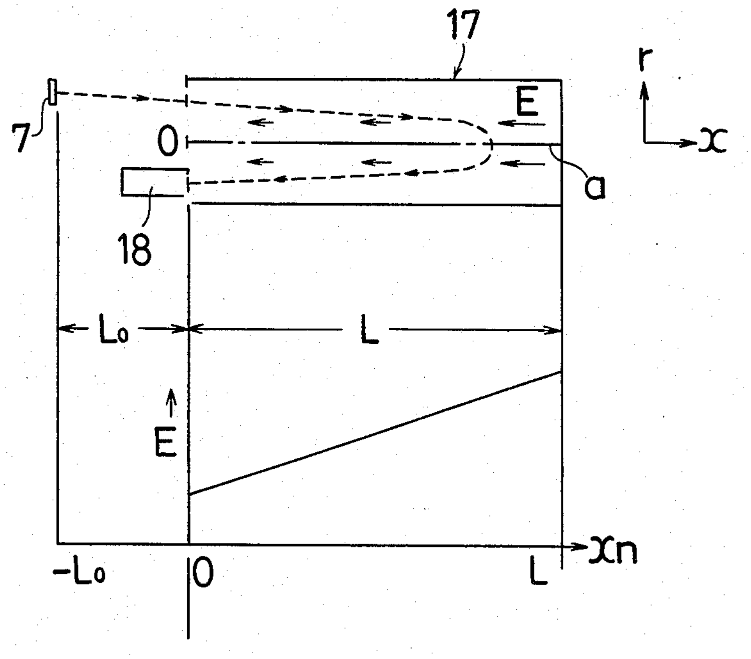
FIG. 4 is a model chart showing the flying path of ions in the apparatus shown in FIG. 1.

Since the electric field E within the analyzer tube 17 is obtained by differentiating the voltage Vn with the distance Xn, it can be expressed as:

$$E = \alpha Xn + \beta \ldots \quad (1\text{-}4)$$

and thus it is the sum of the electric field gradient $E_1$ ($=\alpha Xn$) in proportion to the distance Xn and the electric field $E_2$ ($=\beta$) at a constant level. The direction of the electric field E is determined depending on the polarity of a DC power source such that ions emitted from the ion emitting means 15 are turned back to the ion emitting means 15. Then, ions emitted from the ion emitting means 15 to the inside of the analyzer tube 17 are turned back by the electric field E and come out again toward the ion emitting means 15 in a U-shaped path as shown in FIG. 4 provided that the size of the analyzer tube 17 is sufficiently large.

It is assumed here that an ion of mass m, charge q and initial energy $V_0$ is emitted to the inside of the analyzer tube 17, and the direction of the axis a in the analyzer tube 17 is taken as the direction X and the direction in perpendicular to the axis a as the direction r.

Since the ion has the energy $V_0$ as a kinetic energy, the initial velocity $S_0$ of the ion is defined by the following equation (2-1).

$$S_0 = \sqrt{\frac{2qV_0}{m}} \quad (2\text{-}1)$$

That is, it can be seen that when the initial energy $V_0$ has a certain spread it is expressed as the spread of the initial velocity $S_0$ of the ion.

Assuming the distance from the generation position of the ion to the analyzer tube 17 as $L_0$, the velocity $S_0$ is constant since there is no electric field effecting on the velocity of the ion during this distance and, accordingly, the time of flight $T_0$ is represented as:

$$T_0 = \frac{L_0}{S_0} = L_0\sqrt{\frac{m}{2qV_0}} \quad (2\text{-}2)$$

By the way, since the kinetic equation in the analyzer tube 17 is put under the effect of a force by the electric field E in the direction opposite to the direction of the axis a, that is, the direction X, the equation is expressed as:

$$m\frac{d^2Xn}{dt^2} = -qE = -q\alpha Xn - q\beta \quad (3\text{-}1)$$

The equation (3-1) is dissolved under the initial conditions assuming the time at which the ion enters into the analyzer tube 17 as t=0, the position of the entry as Xn=0 and the velocity as $S_0$ into:

$$Xn = \sqrt{\frac{2V_0}{\alpha}} \sin\sqrt{\frac{q\alpha}{m}}\, t + \frac{\beta}{\alpha} \cos\sqrt{\frac{q\alpha}{m}}\, t - \frac{\beta}{\alpha} \quad (3\text{-}2)$$

The above equation can be modified as:

$$Xn = \sqrt{\frac{2V_0}{\alpha} + \left(\frac{\beta}{\alpha}\right)^2} \sin\left(\sqrt{\frac{q\alpha}{m}}\, t + \theta\right) - \frac{\beta}{\alpha} \quad (3\text{-}3)$$

$$\text{where } \theta = \arctan\left(\frac{\beta}{\alpha}\sqrt{\frac{\alpha}{2V_0}}\right)$$

The voltage for the electrode at the rearmost end of the analyzer tube 17, that is, a supplied voltage $V_L$ is represented by the equation (1-1) and equation (1-2) as:

$$V_1 = \tfrac{1}{2}\alpha L^2 \ldots \quad (3\text{-}4)$$

$$V_2 = \beta L \ldots \quad (3\text{-}5)$$

When the above equations are applied to the equation (3-3), the equation (3-6) can be obtained as:

$$Xn = L\sqrt{\frac{V_0}{V_1} + \left(\frac{V_2}{2V_1}\right)^2} \sin\left[\frac{1}{L}\sqrt{\frac{2qV_1}{m}}\, t + \theta\right] - L\sqrt{\frac{V_2}{2V_1}} \quad (3\text{-}6)$$

$$\text{where } \theta = \arctan\left(\frac{V_2}{2\sqrt{V_0 V_1}}\right)$$

Since the time of flight $T_1$ during which the ion enters into the analyzer tube 17 and gets out of it again is a time t (excluding t=0) giving Xn=0 in the equation (3-6), the time of flight can be expressed as:

$$T_1 = L\sqrt{\frac{m}{2qV_1}}\left[\pi - \arcsin\left(\frac{1}{\sqrt{1 + \frac{4V_0V_1}{V_2^2}}}\right) - \arctan\left(\frac{1}{\sqrt{\frac{4V_0V_1}{V_2^2}}}\right)\right] \quad (3\text{-}7)$$

The above equation can be arranged into:

$$T_1 = L\sqrt{\frac{m}{2qV_1}}\left[\pi - 2\arctan\left(\frac{V_2}{2\sqrt{V_0V_1}}\right)\right] \quad (3\text{-}8)$$

Now since the total time of flight T is the sum of $T_0$ and $T_1$, it can be expressed as:

$$T = \left\{\frac{L_0}{\sqrt{V_0}} + \frac{L}{\sqrt{V_1}}\left[\pi - 2\arctan\left(\frac{V_2}{2\sqrt{V_0V_1}}\right)\right]\right\}\sqrt{\frac{m}{2q}} \quad (3\text{-}9)$$

Now considering the case where the initial energy $V_0$ has a certain spread as $V_0+\Delta V_0$, and putting $$\frac{V_2}{2\sqrt{V_0V_1}} = U, \text{ and } \frac{\Delta V_0}{V_0} = \delta$$

for the sake of the expression, the equation is developed with respect to δ while neglecting the third and higher terms as:

$$T + \Delta T = \quad (4\text{-}1)$$

$$\left\{\frac{L_0}{\sqrt{V_0}}\left(1 - \frac{\delta}{2} + \frac{3}{8}\delta^2\right) + \frac{L}{\sqrt{V_1}}\left[\pi - 2\left(\arctan U - \frac{U}{2(1+U^2)}\delta + \frac{U(U^2+3)}{8(1+U^2)^2}\delta^2\right)\right]\right\}\sqrt{\frac{m}{2q}} =$$

$$\left\{\frac{L_0}{\sqrt{V_0}} + \frac{L}{\sqrt{V_1}}\cdot\pi - 2\cdot\frac{L}{\sqrt{V_1}}\arctan U + \left[-\frac{L_0}{2\sqrt{V_0}} + \frac{U}{(1+U^2)}\cdot\frac{L}{\sqrt{V_1}}\right]\delta + \left[\frac{3L_0}{8\sqrt{V_0}} - \frac{L\cdot U(U^2+3)}{4\sqrt{V_1}\,(1+U^2)^2}\right]\delta^2\right\}\sqrt{\frac{m}{2q}}$$

The condition reducing the coefficient for the primary term of δ to zero is determined as:

$$V_2 = 2\frac{L}{L_0}V_0\left[1 - \sqrt{1 - \left(\frac{L_0}{L}\right)^2\cdot\left(\frac{V_1}{V_0}\right)}\right] \quad (4\text{-}2)$$

Applying the result to the coefficient for the secondary term of δ, it can be expressed as:

$$\frac{L_0}{4\sqrt{V_0}}\left(1 - \frac{L_0}{L}\cdot\frac{V_1}{V_2}\right) \quad (4\text{-}3)$$

The above term can be reduced to zero only if $V_2=L_0/L.V_1$ However, in order to satisfy the above condition and the equation (4-2) simultaneously, it is required that $L_0=0$. However, since $L_0\neq 0$ in this apparatus, the above condition can not be satisfied, and accordingly, the secondary term of δ can not be reduced to zero. After all, the total time of flight satisfying the equation (4-2) is expressed as:

$$T + \Delta T = \left\{ \left( \frac{L_0}{\sqrt{V_0}} + \frac{L}{\sqrt{V_1}} \cdot \pi - 2\frac{L}{\sqrt{V_1}} \arctan\left( \frac{V_2}{2\sqrt{V_0 V_1}} \right) \right) \right\} \sqrt{\frac{m}{2q}} + \left\{ \frac{L_0}{4\sqrt{V_0}} \left( 1 - \frac{L_0}{L} \cdot \frac{V_1}{V_2} \right) \left( \frac{\Delta V_0}{V_0} \right)^2 \right\} \sqrt{\frac{m}{2q}} \quad (4\text{-}4)$$

That is, the term of $$\left( \frac{\Delta V_0}{V_0} \right)^2$$

determines the resolution power.

Now, in view of the equation (3-9) or (4-4), $T \alpha \sqrt{m}$ and, accordingly, $$\Delta T = \frac{1}{2} \cdot \frac{\Delta m}{\sqrt{m}} .$$

Then, the resolution power is determined as:

$$\frac{m}{\Delta m} = \frac{1}{2} \cdot \frac{T}{\Delta T} \quad (4\text{-}5)$$

Substituting the equation (4-5) with the equation (4-4) gives an equation:

$$\frac{m}{\Delta m} = \frac{2\left\{ 1 + \frac{L}{L_0} \sqrt{\frac{V_0}{V_1}} \left[ \pi - 2\arctan\left( \frac{V_2}{2\sqrt{V_0 V_1}} \right) \right] \right\}}{1 - \frac{L_0}{L} \cdot \frac{V_1}{V_2}} \cdot \left( \frac{V_0}{\Delta V_0} \right)^2 \quad (4\text{-}6)$$

Now assuming $L_0 = 0.085$ m, $L = 0.25$ m, $V_0 = 2000$ V and $V_1 = 2000$ V in this apparatus, it may beset that $V_2 = 700.88$ V from the condition in the equation (4-2). Then, the equation (4-6) can be given as:

$$\frac{m}{\Delta m} \approx 2.476 \times 10^9 \times \frac{1}{\Delta V_0^2} \quad (4\text{-}7)$$

Assuming $\Delta V_0$, for instance as 200 V, it gives $$\frac{m}{\Delta m} = 61900$$

which means a resolution power extremely superior to that in the conventional time of flight mass spectrometer.

Figure 5:
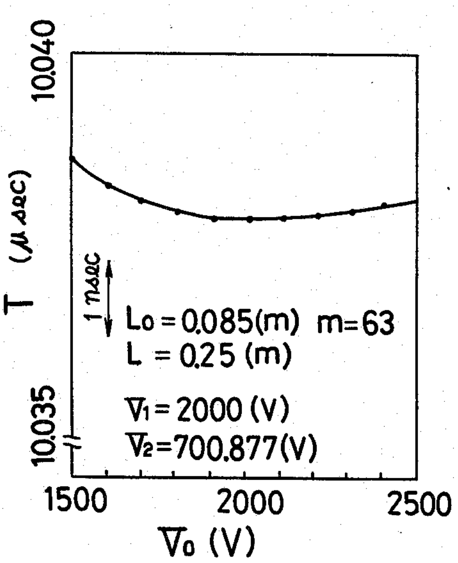
FIG. 5 is a characteristic chart for illustrating the resolution of one embodiment of time of flight mass spectrometer according to this invention.

FIG. 5 is a graph showing the relationship between the initial energy $V_0$ and the time of flight T according to the equation (3-9). The conditions for the apparatus are: $L_0 = 0.085$ m, $L = 0.25$ m, $V_1 = 2000$ V and $V_2 = 700.877$ V so as to satisfy the equation (4-2) when $V_0 = 2000$ V. The mass is set as $m = 63$ assuming the case of the copper ion. As can be seen from FIG. 5, even if the initial energy $V_0$ varies about from 2000 V to 500 V, the time of flight T has only a spread of 1 nsec, which means an extremely excellent performance.

Although this invention has been described with respect to the foregoing particular embodiment, this invention can also be modified in various other embodiments so long as they are within the concept of this invention in which the electric field E is formed in the analyzer tube so that the principle of pendulum can be applied to the ions flying in the analyzer tube.

For instance, the analyzer tube in this invention may be structured such that a plurality of ring-like electrodes are arranged along the axis with the potential difference between each of the adjacent electrodes being constant and the distance between each of the electrodes is narrowed gradually, so as to form a desired electric field.

Alternatively, the analyzer tube may also be formed with distributed resistance having a specific resistance of $aXn^2 + bXn$ (Xn is distance), by which a desired electric field can be generated within the analyzer tube in the same manner as in other embodiments.

Figure 6:
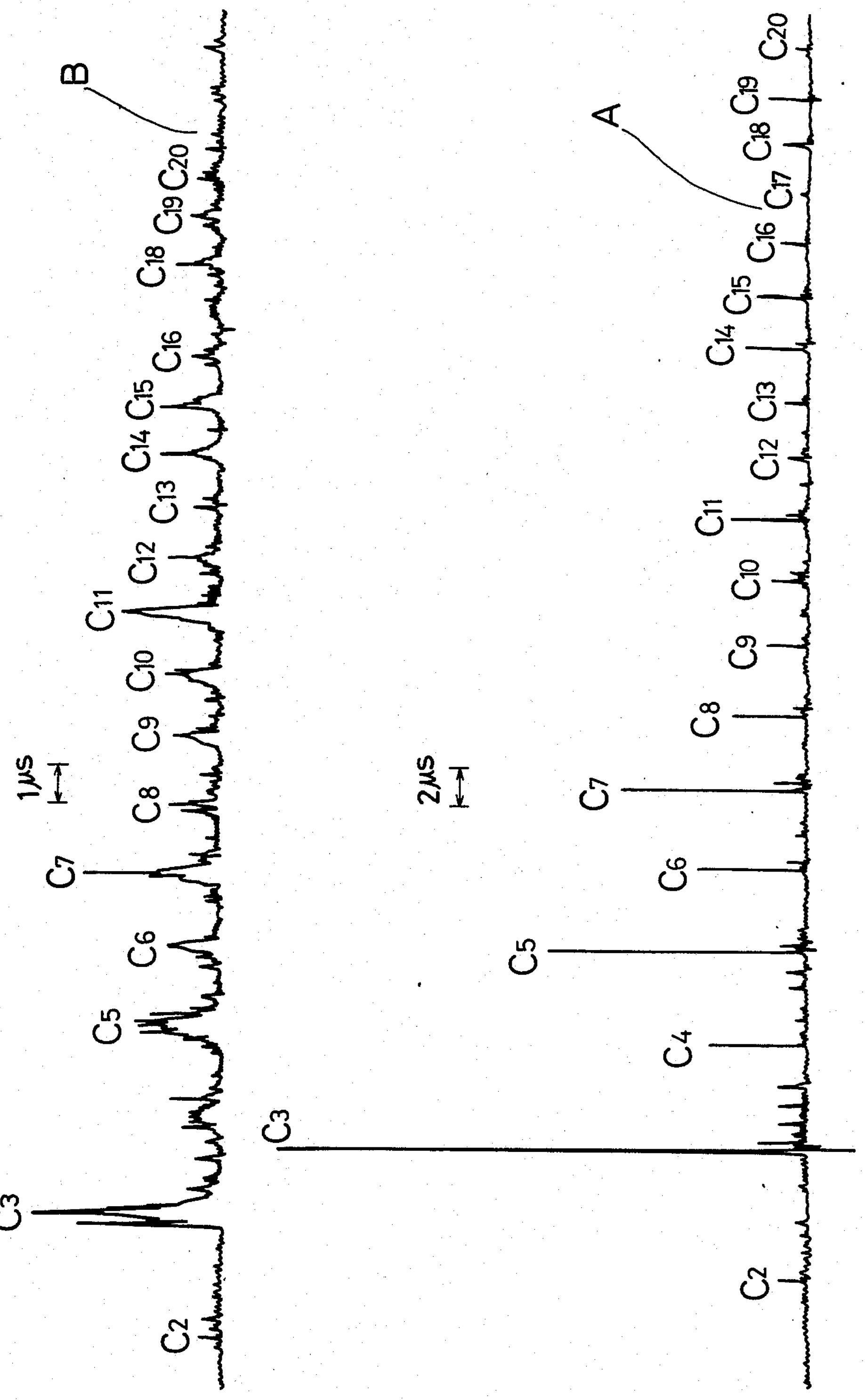
FIG. 6 is a spectrum showing each result of analisis with time of mass spectrometers according to this invention and prior art.

Finally, FIG. 6 shows the result A of analysis using the embodiment according to this invention together with the result B of analysis obtained by the conventional apparatus.

The conventional apparatus used herein is a liner type time of flight mass spectrometer in which the distance between the ion emitting means and the detector is about 1.45 m and 2000 V of a sample voltage is applied to a sample stage.

In the apparatus of the embodiment according to this invention, the length of the free drift region is 0.2 m and that of the analyzer tube is 1 m and voltages of 2400 V and 2000 V are applied respectively to the analyzer tube and the sample stage.

Pulse laser beams are radiated to a carbon sample to generate ions therefrom.

From the above result, it can be seen that the resolution power of the analyzer according to this embodiment is higher than that of the conventioanl apparatus since the relative strength of cluster ions (C1, C2, . . . C20) are represented more clearly as compared with the result of the conventioanl apparatus. Further, it is also possible to analyze the cluster ion C4 and C17 in this invention that could not be analyzed clearly in the conventioanl apparatus.

What is claimed is:

1. A time of flight mass spectrometer comprising: an ion emitting means having a sample stage applied with a voltage and a radiating means for radiating pulse beams to a sample for generating ions therefrom, an analyzer tube having a plurality of ring-like electrodes secured at an equal interval from each other on the same axis of direction; means for applying a voltage Vn to each of said ring-like electrodes, said applied voltage Vn applied to an nth ring-like electrodge from said ion emitting means having a relationship with respect to the distance Xn from the ion emitting means to the nth ring-like electrode defined by the expression $Vn = a(Xn)^2 + b(Xn)$, where a and b are constants represented by the expression $b = V_L/L - aL$, with L being the length of the analyzer tube and $V_L$ being the voltage applied to the ring-like electrode at the rearmost end of the analyzer tube, with said voltage Vn for each of said other electrodes increasing in proportion to both said distance Xn and to the square of said distance Xn viewed from a common reference point on the side of said ion emitting means to said analyzer tube, and an ion detecting means disposed opposing to said analyzer tube for detecting ions turned back from the inside and getting out of the analyzer tube, whereby the detected ions emitted from said ion emitting means travels in said analyzer tube along U shaped flying passes.

2. The time of flight mass spectrometer as defined in claim 1, wherein said means for applying said voltage Vn to each of said ring-like electrodes comprises a voltage divider circuit composed of resistors respectively connected between each of said ring-like electrodes.

3. The time of flight mass spectrometer as defined in claim 1, wherein the ion emitting means comprises an ion lens having a plurality of electrodes secured on the same axis and ions fly substantially on said axis where the electric field prepared by the electrode is present for acceleration.

4. The time of flight mass spectrometer as defined in claim 3, wherein the ion lens is composed of cylindrical electrodes.

5. The time of flight mass spectrometer as defined in claim 1, wherein the ion detecting means comprises a micro channel plate having an ion passing aperture formed at the center thereof.

6. The time of flight mass spectrometer as defined in claim 1, wherein the ion detecting means is situated between the ion emitting means and the analyzer tube and on the same axis, said ion detecting means having a detecting face, with said detecting face being opposed to the analyzer tube.

7. The time of flight mass spectrometer as defined in claim 1, wherein the analyzer tube comprises 100 sheets of ring-like electrodes each having 1 mm thickness and 40 mm inner ring diameter secured to constitute an ion-flying space.

8. The time of flight mass spectrometer as defined in claim 1, wherein said radiating means comprises pulse electron beams.

9. The time of flight mass spectrometer as defined in claim 1, wherein said radiating means comprises pulse laser beams.

* * * * *

UNITED STATES PATENT AND TRADEMARK OFFICE
CERTIFICATE OF CORRECTION

PATENT NO. : 4,625,112

DATED : November 25, 1986

INVENTOR(S) : Yoshikazu Yoshida

It is certified that error appears in the above-identified patent and that said Letters Patent is hereby corrected as shown below:

Corrections

In column 1, line 10: Change "travalling" to --travelling--;
In column 1, line 19: After "of" delete "a";
In column 1, line 20: Change "the" to --a--;
In column 2, line 27: Change "analisis" to --analysis--;
In column 3, line 15: Change "step" to --stage--;
In column 3, line 21: After "the" omit "a";
In column 3, line 44: Change "resister" to --resistor--;
In column 4, line 37: After "direction" delete "in";
In column 6, line 64: Change "$V_2 = Lo/L.V_1$" to --$V_2 = Lo/L \cdot V_1$.--;
In column 7, line 53: Change "beset" to --be set--;
In column 8, line 33: Change "liner" to --linear--;
In column 8, line 47: Change "conventioanl" to --conventional--;
In column 8, line 50: Change "conventioanl" to --conventional--;
In column 8, line 53: Change "conventioanl" to --conventional--;
In column 8, line 63: Change "electrodge" to --electrode--.

Signed and Sealed this

Second Day of February, 1988

*Attest:*

DONALD J. QUIGG

*Attesting Officer* *Commissioner of Patents and Trademarks*